UNITED STATES PATENT OFFICE 2,581,299

PROCESS FOR PRESERVING THE FRESHNESS OF CUT FERNS

Mary P. Rogers, Hilo, Territory of Hawaii

No Drawing. Application December 15, 1950,
Serial No. 201,071

19 Claims. (Cl. 47—58)

My invention is a novel and useful method of processing cut ferns to increase their moisture content and preserve their freshness over an elongated period of time, during which they remain useful for decorative purposes.

My method is particularly useful with respect to New Zealand maiden hair ferns of both the giant and baby varieties. These ferns are notoriously susceptible to drying out, and wilt within a very few hours on the same day they are cut. This weakness accounts for the fact that they are not presently used by florists in the cut state despite the exotic and highly ornamental appearance of the fern. The stem and branches of the maiden hair fern are shiny black, closely resembling "patent leather," while the leaves are somewhat diamond-shaped, are green in color, and have fine lines extending outwardly from the stem to the edges of the leaves which are serrated on the two far edges of the diamond.

The principal object of my invention, therefore, is to provide a simple and practical process whereby the freshness and attractive appearance of the cut ferns may be preserved for several weeks so that they may be shipped to florists and sold by them either individually or along with other cut flowers or foliage.

Another important object of my process is to provide an inexpensive process for treating ferns whereby the cut foliage is caused to absorb and retain moisture, particularly in the leaves.

An important advantage of my process is that it may be utilized without the necessity of special equipment, ordinary implements and containers found in the average household being sufficient. Moreover, no special chemicals or mixtures are required since the only materials used in the process are water, ice and heating means.

Other advantages of my invention will become apparent during the following description of the process.

Although my process may be used to advantage on ferns in various stages of development, it is desirable that the ferns be cut or picked just before they have reached full maturity. In the maiden hair fern, the optimum time for picking can be determined by observation of the stage of development of the seed pods appearing at the very end of the leaves. These pods should not be developed and brown, but should be young and green since ferns picked at this stage of development will last longer after being processed than will the older ones, the stems of which also become brittle after processing. The older ferns dried in four to seven days after they were processed, but leaves with undeveloped seeds remained green from ten to fourteen days average, with some lasting as long as twenty-one days.

After the ferns have been cut at the proper stage of development, it is extremely important that they be processed within a very short time. By practical tests, I have determined that a delay of more than twenty minutes after cutting will greatly reduce the efficacy of the processing, and by thirty minutes after cutting there is apparent a marked drying out of the stems which can not be compensated for in the processing. As a practical matter, I always process my ferns within about ten minutes of cutting.

A close inspection of the stem of the maiden hair fern will show that it consists of the outer dark-colored bark; next to it, a light lining; and finally the soft pulp-like center of the stem. It is the light lining that must be processed in order to open the way for water to be drawn into the leaves. This light lining apparently contains a fluid which not only seals the cut end of the stem but also seals the inside of the stem against absorption of water through the bark.

The purpose to be accomplished by the processing is the temporary softening of the sealing fluid in the bark lining to permit passage of water therethrough. Through practical experiment I have discovered that the immersion of the stems in warm water will give the desired softening effect and that the subsequent chilling of the stems in ice water will reharden the sealing fluid and trap the moisture in the stem.

The first step of the process is therefore to provide a pan of water, heated to about 125° F. If the water is cooler, it will not soften the sealing fluid below the bark; if it is warmer, the plant is apparently injured by the heat, or perhaps the sealing fluid is dissolved and carried off.

The ferns should be loosely tied in convenient size bunches with the branches from the main stems tied upwardly so that the leaves may be kept out of the warm water. As much of the stems should be immersed as possible, but the leaves and about the last two or three inches of stem adjacent thereto must be kept clear of the warmth and, in fact, sprinkled or sprayed thoroughly on both sides with cool water since heat has a drying effect on the leaves. The length of time for immersion in the warm water depends on the size of the stems. It is better not to leave the stems in the warm water any longer than necessary to permit maximum absorption of moisture. Too long a period of immersion makes the stems become brittle after processing. For stems of about ⅛″ at the cut end, about two minutes of immersion is optimum. One-tenth inch diameter requires about one and one-half minutes; whereas stems of 1/20″ diameter require one minute; and stems of 1/40″ diameter require only about twenty seconds.

The water thus absorbed by the stems goes to the leaves as is demonstrated by a slight swelling up thereof and by the fact that whenever I process any large number of leaves, the water disappears from the container noticeably. As the ferns are removed from the 125° water, if the stems are held upright, the water will run out of the stems at the cut end, but if the ferns are inverted, the water will run into the leaves. The ferns should be held in this latter position under a cold shower for a short time to cool the ferns and to relieve the shock of the warm water in the leaves. When properly chilled, the leaves will absorb more water and will have a more graceful appearance. Moreover, the sprinkling cleans dust from the leaves and allows them to breathe air.

Finally, the stems should be immersed in an ice water bath for about four hours to complete the process and to insure maximum retention of moisture in the ferns.

In the case of ferns which have been grown in very rich soil, processing may make the leaves turn brown at first, but the brownness gradually disappears and the leaves return to green shade.

In general, the processed leaves will last no longer than the time required for the seeds to fully develop, about twenty-three days maximum, depending on when the ferns are cut.

After the ferns are processed, they should be kept in a vase containing water. In hot, dry weather the ferns will last longer if the water in the vase is cooled by ice cubes. In addition, daily sprinkling of the leaves with water is recommended, and during shipment of ferns, they should be packaged in damp material and kept cool.

I claim:

1. The process of preserving the freshness of cut leafy ferns of the maiden hair or similar variety, having stems with soft pulp-like centers and having outer bark with linings interposed therebetween containing natural sealing fluids, consisting of the steps of cutting the ferns prior to reaching full maturity; immersing the stems in warm water at substantially 125° F. before the stems dry out to temporarily soften the sealing fluids and permit absorption of water through the linings to the leaves; continuing said warm water immersion step until the absorbed water produces a noticeable swelling of the leaves; removing the stems from the water and immediately upending the same to prevent the absorbed water from running out of the stems; and finally immersing the stems in ice water to reharden the sealing fluids and the linings of the stems, thereby retaining the absorbed water in the stems and leaves.

2. A process as set forth in claim 1 in which the warm water immersing is performed within twenty minutes after cutting.

3. In a process as set forth in claim 1, the step of tieing the leafy branches upwardly away from the stems before the warm water immersing step.

4. In a process as set forth in claim 1, the step of tieing the leafy branches upwardly away from the stems before the warm water immersing step; the stems being immersed in the warm water up to a point below the said leafy portions.

5. In a process as set forth in claim 1, the duration of the warm water immersing step ranging from approximately two minutes for stems of approximately ⅛″ diameter, to approximately twenty seconds for stems of approximately 1/40″ diameter.

6. In a process as set forth in claim 1, the duration of the ice water immersion step being approximately four hours.

7. The process of preserving the freshness of cut leafy ferns of the maiden hair or similar variety having stems with soft pulp-like centers and having an outer bark with linings interposed therebetween containing natural sealing fluids, consisting of the steps of cutting the ferns prior to reaching full maturity; loosely tieing the stems together in bunches; immersing the bunches in warm water at substantially 125° F. before the stems dry out to temporarily soften the sealing fluids and permit absorption of water through the linings to the leaves; continuing said warm water immersion step until the absorbed water produces a noticeable swelling of the leaves; removing the bunches from the water and immediately upending the same to prevent the absorbed water from running out of the stems; and finally immersing the stems in ice water to reharden the sealing fluids and the linings of the stems, thereby retaining the water in the stems and leaves.

8. A process as set forth in claim 7 in which the warm water immersing is performed within twenty minutes after cutting.

9. In a process as set forth in claim 7, the step of tieing the leafy branches upwardly away from the stems before the warm water immersing step.

10. In a process as set forth in claim 7, the step of tieing the leafy branches upwardly away from the stems before the warm water immersing step; the stems being immersed in the warm water up to a point below the said leafy portions.

11. In a process as set forth in claim 7, the duration of the warm water immersing step ranging from approximately two minutes for stems of approximately ⅛″ diameter, to approximately twenty seconds for stems of approximately 1/40″ diameter.

12. In a process as set forth in claim 7, the duration of the ice water immersion step being approximately four hours.

13. The process of preserving the freshness of cut leafy ferns of the maiden hair or similar variety having stems with soft pulp-like centers and having an outer bark with linings interposed therebetween containing natural sealing fluids, consisting of the steps of cutting the ferns prior to reaching full maturity; loosely tieing the stems together in bunches; immersing the bunches in warm water at substantially 125° F. before the stems dry out to temporarily soften the sealing fluids and permit absorption of water through the linings to the leaves; continuing said warm water immersion step until the absorbed water produces a noticeable swelling of the leaves, removing the bunches from the water and immediately upending the same to prevent the absorbed water from running out of the stems; spraying the upended stems and leaves with cold water to cool same; and finally immersing the stems in ice water to reharden the sealing fluids and the linings of the stems, thereby retaining the water in the stems and leaves.

14. A process as set forth in claim 13 in which the warm water immersing is performed within twenty minutes after cutting.

15. In a process as set forth in claim 13, the step of tieing the leafy branches upwardly away from the stems before the warm water immersing step.

16. In a process as set forth in claim 13, the step of tieing the leafy branches upwardly away from the stems before the warm water immersing step; the stems being immersed in the warm water up to a point below the said branches.

17. In a process as set forth in claim 13, the duration of the warm water immersing step ranging from approximately two minutes for stems of approximately 1/8" diameter, to approximately twenty seconds for stems of approximately 1/40" diameter.

18. A process as set forth in claim 13 in which the leaves are sprinkled on both sides with cool water during the immersion of the stems in warm water.

19. In a process as set forth in claim 13, the duration of the ice water immersion step being approximately four hours.

MARY P. ROGERS.

REFERENCES CITED

The following references are of record in the file of this patent:

UNITED STATES PATENTS

New Garden Encyclopedia, 1941, pp. 352, 353, article on "Cut Flowers."